Sept. 21, 1937.  A. L. STAHL  2,093,938
AUTOMOBILE BRAKE CONTROLLER
Filed Dec. 3, 1936   2 Sheets-Sheet 1

Inventor
A. L. Stahl
By L. F. Landreth
Attorney

Sept. 21, 1937.   A. L. STAHL   2,093,938
AUTOMOBILE BRAKE CONTROLLER
Filed Dec. 3, 1936   2 Sheets-Sheet 2

Inventor
A. L. Stahl
By L. F. Laudreth
Attorney

Patented Sept. 21, 1937

2,093,938

UNITED STATES PATENT OFFICE 2,093,938

AUTOMOBILE BRAKE CONTROLLER

Albert L. Stahl, Memphis, Tenn.

Application December 3, 1936, Serial No. 114,043

4 Claims. (Cl. 192—.01)

This invention relates to an automobile brake controller and aims to provide a novel construction which will automatically lock the foot or driving brake of an automobile in the holding or braking position and will also automatically release such brake when the clutch pedal and the accelerator are operated as in the starting of the automobile.

It is also aimed to provide such a controller which will operate to hold an automobile stopped on an incline or grade by automatically locking the foot or driving brake, enabling the operator of the automobile to remove his foot from the brake pedal.

In addition it is aimed to provide such a structure as will cause the driving brake of the automobile to lock in holding position and release automatically, as desired, by the operator, thus eliminating the annoyance of the automobile rolling back during that space of time required for changing the foot from the brake pedal to the accelerator.

Another object is to provide such a structure or controller as will enable operation of an automobile so as to stop on an incline at railroad or grade crossings and start with the same ease as when stopping and starting on a level.

It is further aimed to provide such a structure as consists of a minimum number of parts, simple in operation and durable in structure, a structure which may be embodied in existing automobiles as an attachment and by direct connection with the clutch pedal and the accelerator and in combination with a novel latch engageable with means on the brake pedal.

It is further aimed to provide such a structure wherein the lock consists of two links and a staff, forming a triangle when in locking position, the links being hinged together at one end with one link pivoted to the base and the other link pivoted to the staff, the staff being held in rigid position as to its pivot at the base. When the links are caused to move out of direct line similar to knee action, the staff swings permitting the latch to rotate, disengaging the teeth of the brake pedal arms.

The more specific objects and advantages will become apparent from a consideration of the description following taken in connection with accompanying drawings illustrating an operative embodiment.

In said drawings:—

Figure 6:
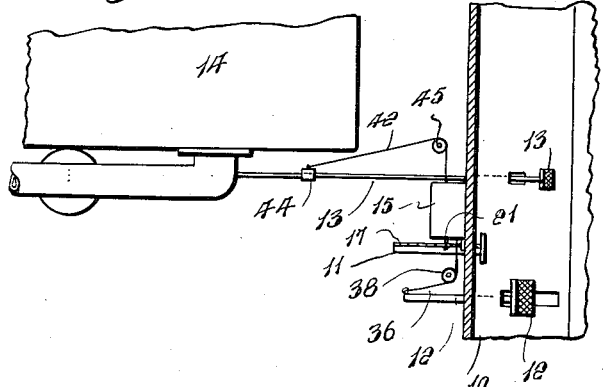
Figure 6 is a horizontal sectional view taken through a fragment of an automobile and showing my improvements applied thereto in plan.
Figure 1:
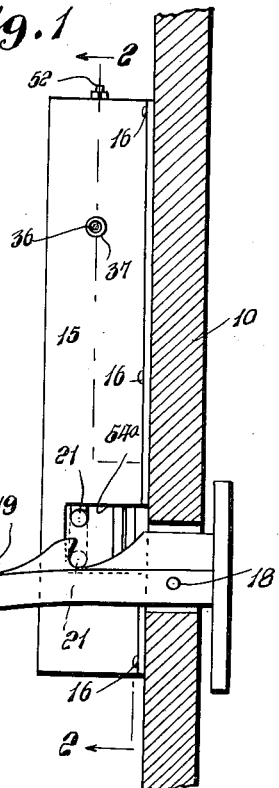
Figure 1 is a view taken longitudinally and in section through a fragment of an automobile, showing my improvements locking a brake pedal.
Figure 4:
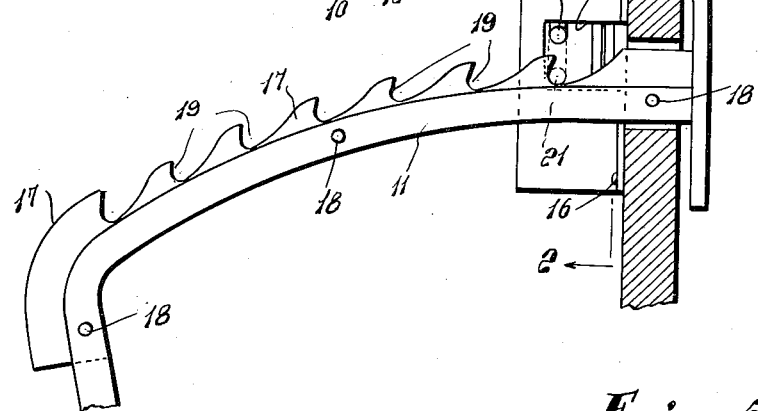
Figure 4 is a detail section taken on the line 4—4 of Figure 2.
Figure 4:
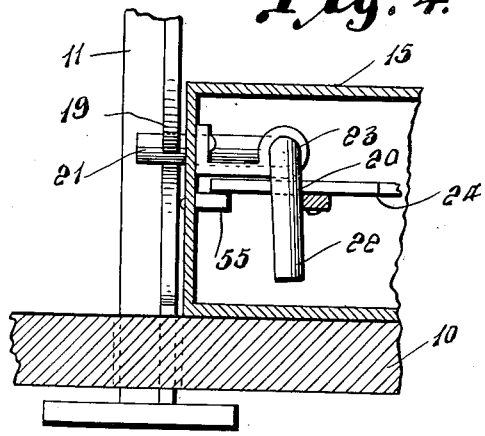
Figure 5:
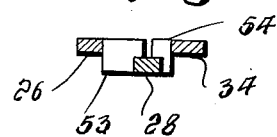
Figure 5 is a detail section taken on the line 5—5 of Figure 2.

Referring specifically to the drawings wherein like reference characters designate like or similar parts, a floor board or lower dashboard constituting conventional structure of an automobile is suggested at 10 and through the same a conventional brake pedal 11 operates, being normally retracted, and adapted to be pushed forward to apply the brake. A conventional forwardly and rearwardly movable clutch pedal is also shown as at 12, mounted through the board 10, as well as an accelerator rod 13, mounted through the board and connected to the carbureter of the propelling internal combustion engine 14 of the automobile.

My improvements are in the nature of an attachment capable of being contained or housed within a casing 15 secured as at 16 to the board 10 and co-acting with parts attached to the brake pedal, clutch pedal and accelerator rod.

A rack bar 17 is riveted or bolted to the brake pedal 11 and has a series of notches 19 therein adapted to be engaged by a latch member at a lug 21 thereon. The latch member also has a lug 22 at its opposite end disposed at an angle to the lug 21. The intermediate portion of the latch member 20, as at 23, is journaled on a vertical axis, on a latch arm or lever 24 pivoted at one end as by a rod 25 to the casing 15. A staff 26 is pivoted at 27 to the latch arm 24 and rises therefrom, having a link 28 pivoted thereto at 29 and in turn pivoted at 30 to another link 31, pivoted on a pin or the like 32 extending from the latch arm 24.

Also pivotally mounted on the pin 32 is a bell crank or similar main control lever 33. Said lever 33 has an arm 34 thereon and also has an arm 35 thereon at right angle to the arm 34. Said arm 34 adjacent its upper end has a flexible cable or the equivalent 36 connected thereto, passing through an eyelet 37 in one wall of the casing 15, and also being connected to the clutch pedal 12, and if desired passing over suitable guide pulley means as at 38.

A release bar 39 in the form of a lever is pivoted at 40 to the arm 35 and the lower end thereof has a contracticle coil spring 41 connected to it and which is also connected to the pin or rod 32. At the upper end, a flexible cable or the like 42 is connected, the same passing through a guide eyelet 43 in one end wall of the casing 15 and being connected also to the slidable accelerator rod 13 at 44, being trained if desired over guide pulley means as at 45.

Figure 2:
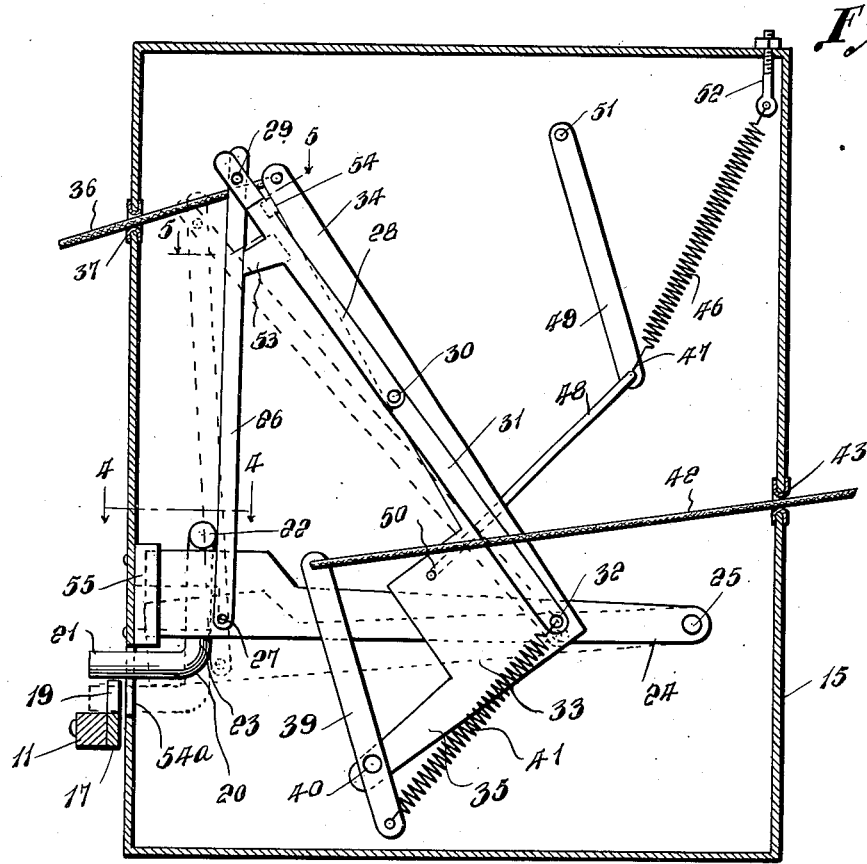
Figure 2 is a sectional view taken substantially on the line 2—2 of Figure 1.
Figure 3:
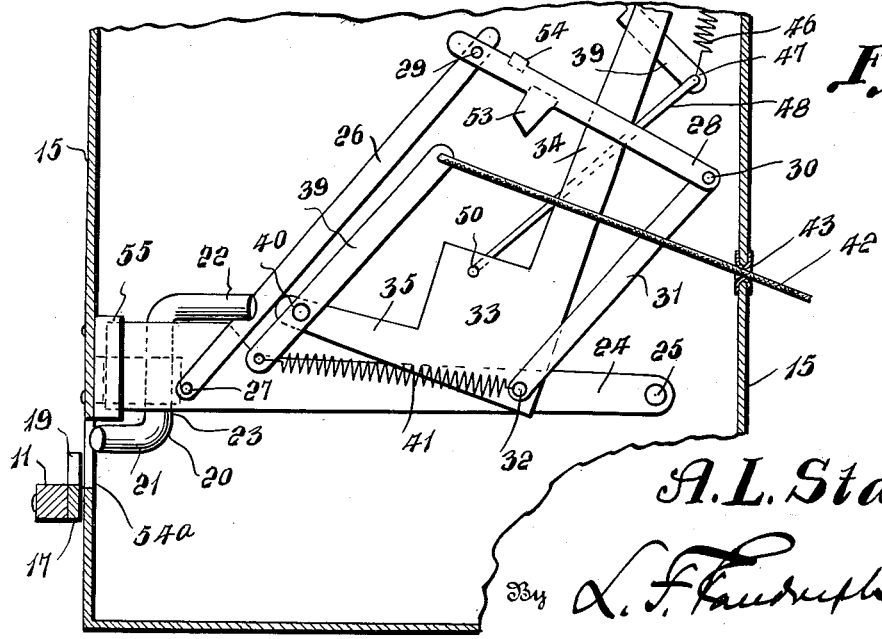
Figure 3 is a view similar to Figure 2 but showing the parts in unlocked or normal position.

Means are provided to urge upward and rearward movement of the bell crank lever 33 from the position of Figure 2 to the position of Figure 3 and may comprise a contractile coil spring 46, connected at 47 to pivotally connected rods 48 and 49, pivoted respectively at 50 and 51 to the bell crank lever 33 and the casing 15. The other end of spring 46 is attached to an adjustable eyelet member 52.

A lug 53 is provided on the link 28 at the proper angle for abutment with the staff 26 and another lug 54 is provided on the opposite side of the same link so as to form an abutment for the arm 34 of the bell crank lever 33.

Normally the parts are in the position shown in Figure 3 being so maintained through the contractile action of the spring 46. In operating the automobile however, depression of the clutch pedal exerts a drawing action on the cable 36 or the equivalent which will swing the staff 26 from the position of Figure 3 to the vertical as in full line in Figure 2, since the cable 36 pulls the arm 34 to the left, the same contacting the lug 54, causing the links 28 and 31 to align and causing the lug 53 to abut the staff 26. The said movement of the staff 26 tilts the latch member 23 since the staff engages the stud 22 thereof. The projection or stud 21 of the latch member 23 moves outwardly through the opening 54ª of the casing 15, as shown in full line in Figure 2, the latch 23, the latch arm 24, links 28 and 31 and the bell crank lever 33 thus forming practically a rigid structure. This is shown in Figure 2 by the full line position as well as the dotted line position. The parts assume the said rigid relation in the full line position so that a slight further depression of the clutch pedal moves the parts to the dotted line position where the lug or stud 21 engages the adjacent notch 19 of the depressed brake pedal 11. In this position, the arm 39 will be in such a position that the cable 42 is slack and operation or depression of the accelerator rod 13 will not affect it. However upon resuming operation of the car, depression of the clutch pedal and the accelerator rod 13 will move the arm 39 as well as the bell crank lever 33 rearwardly, so that the upper end of the arm 39 engages one of the links 31 adjacent the pivot 30 so as to break joint, whereupon the previously tensioned spring 46 will retract all of the parts to the normal position of Figure 3.

The operation of the latch arm at its free end may be guided by the device 55 secured interiorly of and to the casing.

Various changes may be made within the spirit and scope of the invention.

I claim as my invention:—

1. In an automobile control mechanism, in combination with the clutch pedal, the brake pedal and the accelerator rod, a latch mechanism comprising articulate parts, means operable through movement of the clutch pedal to move said parts into rigid relation and into locking engagement with the brake lever, means operable by the accelerator rod to break a joint of said parts for retraction thereof, and spring means tensioned through the depression of the clutch pedal serving to restore the parts to normal position after breaking the said joint.

2. In an automobile control mechanism, in combination with the clutch pedal and the brake pedal, a latch arm pivotally mounted, a normally retracted latch member movably mounted by the arm, a staff pivoted to the latch arm, articulate link means pivoted to the staff and to the latch arm, a lever pivoted to the latch arm on the same axis as the link means, means operable by depression of the clutch pedal to contact the lever with the link means to align the latter and to cause contact of the latter with the staff and move the staff to project the latch member and thereafter to engage the projected latch member with the brake pedal.

3. In an automobile control mechanism, in combination with the clutch pedal and the brake pedal, a latch arm pivotally mounted, a normally retracted latch member movably mounted by the arm, a staff pivoted to the latch arm, articulate link means pivoted to the staff and to the latch arm, a lever pivoted to the latch arm on the same axis as the link means, means operable by depression of the clutch pedal to contact the lever with the link means to align the latter and to cause contact of the latter with the staff and move the staff to project the latch member and thereafter to engage the projected latch member with the brake pedal, means carried by said lever, and an element operable by depression of the control rod to move the last mentioned means against the link means to break a joint thereof.

4. In an automobile control mechanism, in combination with the clutch pedal and the brake pedal, a latch arm pivotally mounted, a normally retracted latch member movably mounted by the arm, a staff pivoted to the latch arm, articulate link means pivoted to the staff and to the latch arm, a lever pivoted to the latch arm on the same axis as the link means, means operable by depression of the clutch pedal to contact the lever with the link means to align the latter and to cause contact of the latter with the staff and move the staff to project the latch member and thereafter to engage the projected latch member with the brake pedal, means carried by said lever, an element operable by depression of the control rod to move the last mentioned means against the link means to break a joint thereof, contractile coil spring means connected to the lever and adapted to be tensioned as the parts are moved to brake locking position.

ALBERT L. STAHL.